US012425876B2

(12) United States Patent
Rathore et al.

(10) Patent No.: US 12,425,876 B2
(45) Date of Patent: Sep. 23, 2025

(54) SYSTEMS AND METHODS FOR OPTIMIZING ANTENNA TILT IN A CELLULAR SITE

(71) Applicant: Rakuten Symphony, Inc., Tokyo (JP)

(72) Inventors: Durgesh Rathore, Indore (IN); Sudeep Kumar Jain, Indore (IN); Keshav Sharma, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/018,706

(22) PCT Filed: Dec. 27, 2022

(86) PCT No.: PCT/US2022/054060
§ 371 (c)(1),
(2) Date: Jan. 30, 2023

(87) PCT Pub. No.: WO2024/144762
PCT Pub. Date: Jul. 4, 2024

(65) Prior Publication Data
US 2025/0097723 A1  Mar. 20, 2025

(51) Int. Cl.
*H04W 16/28* (2009.01)
*H04W 56/00* (2009.01)
*H04W 64/00* (2009.01)

(52) U.S. Cl.
CPC ....... *H04W 16/28* (2013.01); *H04W 56/0045* (2013.01); *H04W 64/003* (2013.01)

(58) Field of Classification Search
CPC .......... H04W 16/28; H04W 56/0045; H04W 64/003
(Continued)

(56) References Cited

U.S. PATENT DOCUMENTS 10,389,498 B2 * 8/2019 Park .............. H04W 72/27
2014/0087754 A1 * 3/2014 Siomina .......... H04W 4/02
455/456.1

(Continued)

OTHER PUBLICATIONS

International Search Report issued Apr. 10, 2023 in Application No. PCT/US2022/054060.
(Continued)

*Primary Examiner* — Nghi H Ly
(74) *Attorney, Agent, or Firm* — Sughrue Mion, PLLC

(57) ABSTRACT

Methods and systems for optimizing antenna tilt in a cell site of a radio access network (RAN), the system includes: a memory storing instructions; and a processor configured to execute the instructions to: obtain input data for a source cell and for neighboring cells thereof at a plurality of predetermined geolocations; determine an overlap percentage from the input data obtained at the plurality of predetermined geolocations; determine, for the source cell, at least one TA percentage for at least one distance range from a center of the source cell; determine, based on the determined overlap percentage and the determined at least one TA percentage, that the source cell is outside a predetermined cell coverage area; and recommend, based on the determining that the source cell is outside the predetermined cell coverage area, adjustment of the antenna tilt for the source cell to meet the predetermined cell coverage area.

20 Claims, 9 Drawing Sheets

(58) Field of Classification Search
USPC ................ 370/329, 328, 338, 341, 345, 350
See application file for complete search history.

(56) References Cited

U.S. PATENT DOCUMENTS

| | | | |
|---|---|---|---|
| 2020/0314906 A1* | 10/2020 | Goyal | H04B 7/0695 |
| 2020/0351732 A1* | 11/2020 | Mwanje | H04W 24/10 |
| 2024/0064793 A1* | 2/2024 | Ashour | H04W 76/14 |

OTHER PUBLICATIONS

Written Opinion issued Apr. 10, 2023 in Application No. PCT/US2022/054060.

* cited by examiner

SYSTEMS AND METHODS FOR OPTIMIZING ANTENNA TILT IN A CELLULAR SITE

CROSS REFERENCE TO RELATED APPLICATIONS

This application is a National Stage of International Application No. PCT/US2022/054060 filed Dec. 27, 2022.

TECHNICAL FIELD

Systems and methods consistent with example embodiments of the present disclosure relate to optimizing antenna tilt in a cell site of a radio access network (RAN).

BACKGROUND

In the related art, radio access networks (RANs) comprise a plurality of radio cells (i.e., cells), wherein the cells' information is available along with their geolocation. The cells comprise at least one base station that provides communication to a plurality of User Equipment (UEs) distributed over an area that defines the cell. The cell coverage area corresponds to a range that radio signals transmitted by the base station can travel. The range that a base station's radio signals can travel (i.e., the cell coverage area) largely depends on the antenna configuration of its base station.

In particular, antenna tilt is one of the key configuration parameters for the base stations in the cell of a RAN. In the related art, antenna tilts are known to have a significant impact on the capacity and quality of service in a RAN as the antenna tilt determines the direction and orientation of radio signal propagation and thus can control inter-cell overlap (i.e., interference levels between neighboring cells) and self-interference.

In the case of a cell that is configured to have an antenna tilt that results in a coverage that exceeds the coverage area defined for the cell (i.e., the cell is overshooting its coverage area), problems (i.e., a negative impact on overall performance and capacity) may occur in the RAN.

Negative effects on the overall performance and capacity resulting from a cell exceeding (or failing to reach) the defined cell coverage area may include dropped calls, inter-cell interference, handover errors, etc. For example, handover errors may occur due to frequent cell switching of terminals between interfering cells at a particular geographical location in the RAN.

In order to avoid the above-mentioned negative effects on the overall performance and capacity resulting from low dominance (e.g., undershooting cell failing to reach the defined cell coverage area) or overshooting (i.e., a cell exceeding the defined cell coverage area), low dominance cells or overshooting cells must be identified in order to adjust antenna tilt with respect to the defined cell coverage area of the cell itself and the neighboring cells at the respective geolocation of the RAN.

SUMMARY

According to embodiments, systems and methods are provided for optimizing antenna tilt in a cell site of a radio access network (RAN), wherein based on a determination of an overlap percentage and a determination of time advance (TA) percentage (e.g., a self-interferer percentage), one or more source cells are determined to exceed or fail to reach a predetermined cell coverage area. In particular, systems and methods provide for a recommendation to adjust the antenna tilt of one or more source cells, wherein, based on the source cell being determined as overshooting and/or booming a predetermined cell coverage area, the overshooting and/or booming cell is recommended to tilt down its antenna in case an electrical tilt is available, and wherein, based on the source cell being determined as a low dominance cell below a predetermined cell coverage area, the low dominance cell below the predetermined cell coverage area is recommended to tilt up its antenna in case an electrical tilt is available.

As a result, based on predetermined conditions including an overlap percentage and Timing Advance (TA) percentages of TA Key Performance Indicator (KPI) sample data in at least one predetermined distance range from the cell center of a source cell at a predetermined geolocation (i.e., Timing Advance Distribution (TAD) of TA KPI samples available for a source cell in a Performance Management Module (PMM)), a source cell that exceeds the defined cell coverage area can be recommended to tilt down its antenna and a source cell that has a low cell coverage area below the defined cell coverage area can be recommended to tilt up its antenna in order to realize an improvement of overall performance and capacity of cells in the RAN. Thus, the systems and methods avoid negative effects on the overall performance and capacity resulting from cells that exceed (i.e., overshoot) the defined cell coverage area or low dominance cells that fail to reach the defined cell coverage area, enable an optimization of antenna tilt with respect to the defined cell coverage area of the cell itself and the neighboring cells at the respective geolocation of the RAN.

According to embodiments, a system for optimizing antenna tilt in a cell site of a radio access network (RAN), the system includes: a memory storing instructions; and at least one processor configured to execute the instructions to: obtain input data for a source cell and for neighboring cells thereof at a plurality of predetermined geolocations; determine an overlap percentage of the source cell and the neighboring cells thereof from the input data obtained at the plurality of predetermined geolocations; determine, for the source cell, at least one TA percentage for at least one distance range from a center of the source cell; determine, based on the determined overlap percentage and the determined at least one TA percentage, that the source cell is outside a predetermined cell coverage area; and recommend, based on the determining that the source cell is outside the predetermined cell coverage area, adjustment of the antenna tilt for the source cell to meet the predetermined cell coverage area.

The overlap percentage may be determined based on one or more predetermined overlap conditions, the one or more predetermined overlap conditions may include at least one of: a condition that a number of the neighboring cells is greater than or equal to two; and a condition that a number of input data samples is greater than or equal to a predetermined number.

The overlap percentage may be calculated based on a ratio of a number of input data samples obtained for the source cell at the plurality of predetermined geolocations and a total number of input data samples may include the input data samples obtained for the source cell at the plurality of predetermined geolocations and input data samples obtained for the neighboring cells of the source cell at the plurality of predetermined geolocations.

In determining the at least one timing advance (TA) percentage for the at least one distance range from the center of the source cell, the at least one processor may be configured to execute the instructions to: calculate a first TA percentage based on TA data from TA data samples obtained within a first distance range from the center of the source cell; calculate a second TA percentage based on TA data from TA data samples obtained within a second distance range from the center of the source cell; calculate a third TA percentage based on TA data from TA data samples obtained within in a third distance range from the center of the source cell.

In determining that the source cell is outside the predetermined cell coverage area, the at least one processor may be further configured to execute the instructions to: determine that the source cell exceeds the predetermined cell coverage area based on: the calculated third TA percentage is greater than 50%; the calculated overlap percentage is greater than 20%; and the calculated second TA percentage is greater than 2%; and recommend antenna down-tilt, for the source cell determined to exceed the predetermined cell coverage area, in case an electrical tilt is below a maximum value.

In determining that the source cell is outside the predetermined cell coverage area, the at least one processor may be further configured to execute the instructions to: determining that the source cell is a low dominance cell that fails to reach the predetermined cell coverage area based on: the calculated first TA percentage is greater than 50%; the calculated overlap percentage is greater than 30%; and the calculated second TA percentage is greater than 2%; and recommend antenna up-tilt, for the source cell determined to be the low dominance cell, in case an electrical tilt is above a minimum value.

The first distance range is between the center of the source cell and less than one kilometer (KM) from the center of the source cell; wherein the second distance range is equal to or greater than one KM from the center of the source cell and less than 1.5 KM from the center of the source cell; wherein the third distance range is equal to or greater than 1.5 KM from the center of the source cell.

According to embodiments, a method for optimizing antenna tilt in a cell site of a radio access network (RAN), the method includes: obtaining, via a processor, input data for a source cell and for neighboring cells thereof at a plurality of predetermined geolocations; determining, via the processor, an overlap percentage of the source cell and the neighboring cells thereof from the input data obtained at the plurality of predetermined geolocations; determining, via the processor, for the source cell, at least one TA percentage for at least one distance range from a center of the source cell; determining, via the processor, based on the determined overlap percentage and the determined at least one TA percentage, that the source cell is outside a predetermined cell coverage area; and recommending, via the processor, based on the determining that the source cell is outside the predetermined cell coverage area, adjustment of the antenna tilt for the source cell to meet the predetermined cell coverage area.

The overlap percentage may be determined based on one or more predetermined overlap conditions, the one or more predetermined overlap conditions may include at least one of: a condition that a number of the neighboring cells is greater than or equal to two; and a condition that a number of input data samples is greater than or equal to a predetermined number.

The overlap percentage may be calculated based on a ratio of a number of input data samples obtained for the source cell at the plurality of predetermined geolocations and a total number of input data samples may include the input data samples obtained for the source cell at the plurality of predetermined geolocations and input data samples obtained for the neighboring cells of the source cell at the plurality of predetermined geolocations.

The determining the at least one TA percentage may include: calculating, via the processor, a first TA percentage based on TA data from TA data samples obtained within a first distance range from the center of the source cell; calculating, via the processor, a second TA percentage based on TA data from TA data samples obtained within a second distance range from the center of the source cell; calculating, via the processor, a third TA percentage based on TA data from TA data samples obtained within in a third distance range from the center of the source cell.

The determining the source cell is outside the predetermined overage area may include: determining, via the processor, that the source cell exceeds the predetermined cell coverage area based on: the calculated third TA percentage is greater than 50%; the calculated overlap percentage is greater than 20%; and the calculated second TA percentage is greater than 2%; and wherein the recommending the adjustment of the antenna tilt may include recommending antenna down-tilt, for the source cell determined to exceed the predetermined cell coverage area, in case an electrical tilt is below a maximum value.

The determining the source cell is outside the predetermined overage area may include: determining, via the processor, that the source cell is a low dominance cell that fails to reach the predetermined cell coverage area based on: the calculated first TA percentage is greater than 50%; the calculated overlap percentage is greater than 30%; and the calculated second TA percentage is greater than 2%; and wherein the recommending the adjustment of the antenna tilt may include antenna up-tilt, for the source cell determined to be the low dominance cell, in case an electrical tilt is above a minimum value.

The first distance range is between the center of the source cell and less than one kilometer (KM) from the center of the source cell; wherein the second distance range is equal to or greater than one KM from the center of the source cell and less than 1.5 KM from the center of the source cell; wherein the third distance range is equal to or greater than 1.5 KM from the center of the source cell.

According to embodiments, a non-transitory computer-readable recording medium having recorded thereon instructions executable by at least one processor configured to perform a method for optimizing antenna tilt in a cell site of a radio access network (RAN), the method includes: obtaining input data for a source cell and for neighboring cells thereof at a plurality of predetermined geolocations; determining an overlap percentage of the source cell and the neighboring cells thereof from the input data obtained at the plurality of predetermined geolocations; determining, for the source cell, at least one TA percentage for at least one distance range from a center of the source cell; determining, based on the determined overlap percentage and the determined at least one TA percentage, that the source cell is outside a predetermined cell coverage area; and recommending, based on the determining that the source cell is outside the predetermined cell coverage area, adjustment of the antenna tilt for the source cell to meet the predetermined cell coverage area.

The overlap percentage may be determined based on one or more predetermined overlap conditions, the one or more predetermined overlap conditions may include at least one of: a condition that a number of the neighboring cells is greater than or equal to two; and a condition that a number of input data samples is greater than or equal to a predetermined number.

The overlap percentage may be calculated based on a ratio of a number of input data samples obtained for the source cell at the plurality of predetermined geolocations and a total number of input data samples may include the input data samples obtained for the source cell at the plurality of predetermined geolocations and input data samples obtained for the neighboring cells of the source cell at the plurality of predetermined geolocations.

The determining the at least one TA percentage may include: calculating a first TA percentage based on TA data from TA data samples obtained within a first distance range from the center of the source cell; calculating a second TA percentage based on TA data from TA data samples obtained within a second distance range from the center of the source cell; calculating a third TA percentage based on TA data from TA data samples obtained within in a third distance range from the center of the source cell.

The determining the source cell is outside the predetermined overage area may include: determining that the source cell exceeds the predetermined cell coverage area based on: the calculated third TA percentage is greater than 50%; the calculated overlap percentage is greater than 20%; and the calculated second TA percentage is greater than 2%; and wherein the recommending the adjustment of the antenna tilt may include recommending antenna down-tilt, for the source cell determined to exceed the predetermined cell coverage area, in case an electrical tilt is below a maximum value.

The determining the source cell is outside the predetermined overage area may include: determining that the source cell is a low dominance cell that fails to reach the predetermined cell coverage area based on: the calculated first TA percentage is greater than 50%; the calculated overlap percentage is greater than 30%; and the calculated second TA percentage is greater than 2%; and wherein the recommending the adjustment of the antenna tilt may include antenna up-tilt, for the source cell determined to be the low dominance cell, in case an electrical tilt is above a minimum value.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
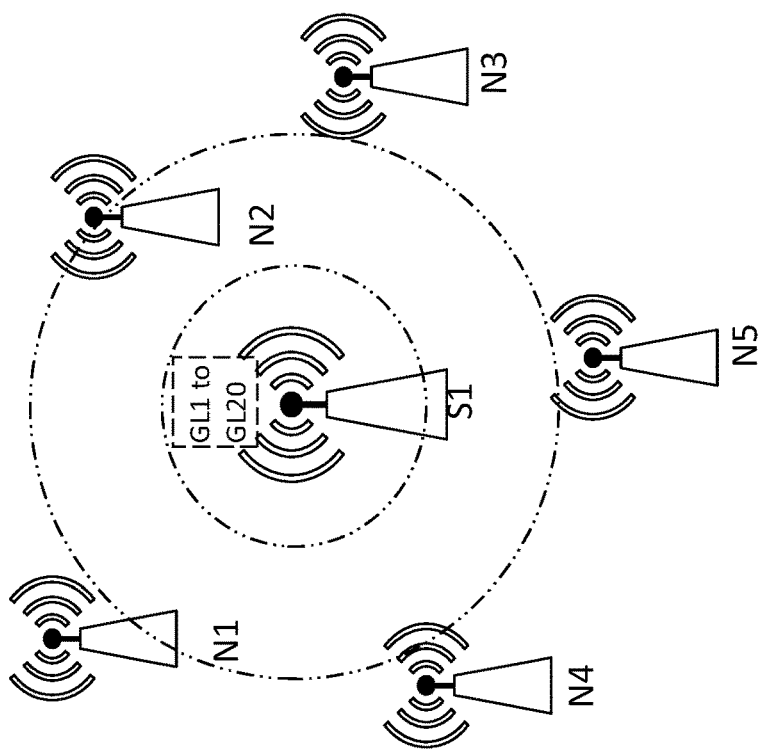
FIG. 1 illustrates a plurality of predetermined geolocations including a source cell and neighboring cells thereof according to an embodiment.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which, based on an overlap percentage between a source cell and its neighboring cells at a plurality of predetermined geolocations (i.e., based on Physical Cell Identity (PCI) check input data samples of the source cell and its neighbor cells) and based Timing Advance (TA) percentages of TA Key Performance Indicator (KPI) sample data in at least one predetermined distance range from the source cell center (i.e., a Timing Advance Distribution (TAD) of TA KPI samples available for a source cell in a Performance Management Module (PMM)), a source cell can be determined to exceed the defined cell coverage area or a source cell can be determined to have a low cell coverage area below the defined cell coverage area. Accordingly, a method and system enable a recommendation to tilt down an overshooting source or a recommendation to tilt-up low dominance to be issued in order to realize an improvement of the overall performance and capacity of cells in the RAN. Thus, the systems and methods allow to avoid negative effects on the overall performance and capacity resulting from exceeding the defined cell coverage area, the antenna tilt (i.e., the cell coverage area) and enable an optimization of antenna tilt with respect to the defined cell coverage area of the cell itself and the neighboring cells at the respective geolocation of the RAN.

FIG. 1 illustrates a plurality of predetermined geolocations including a source cell and neighboring cells thereof according to an embodiment. Referring to FIG. 1, a grid of predetermined geolocations (GL) (e.g., GL1 to GL20) comprises of parts, wherein the parts consisting, for example, of 4, 10, 20 sqm, etc. areas. These areas are used to obtain input data samples mapped to a respective area (i.e., to a predetermined geolocation), for example, test drive samples (e.g., KPIs such as RSRP, CQI, etc.). The input data samples may be obtained from a collection of L3 layer data (i.e., network layer data of the RAN) at the predetermined geolocations (e.g., GL1 to GL20). The test drive samples (i.e., input data samples) comprise input data samples of a source cell and input data samples of neighboring cells thereof.

In FIG. 1, the source cell S1 is the predetermined dominant cell for the geolocation mapped by the grid (i.e., according to the network topology data (e.g., the cell plan) of the RAN, source cell S1 is the predetermined dominant cell for the grid GL1 to GL20). For each of the predetermined geolocations (e.g., GL1 to GL20) input data samples of L3 layer data (i.e., network layer data of the RAN) of the source cell S1 and the neighboring cells thereof can be collected.

For example, in the predetermined geolocation GL1, input data samples of L3 layer data from the source cell S1 and the neighboring cells N1 and N2 can be obtained by drive testing (i.e., obtained by drive test data collection).

In an example embodiment, a precondition for the input data samples at a predetermined geolocation may be introduced. According to the precondition for the input data samples at predetermined geolocations, input data samples taken from a predetermined geolocation must include input data samples from the source cell and from at least two or more neighboring cells. This means, that in accordance with the example embodiment, the input data samples collected from the predetermined geolocations GL9, GL10, GL12 and GL18 may be not eligible for further processing and are discarded during the drive testing.

The discarding of the input data samples means that input data samples taken from predetermined geolocations which do not include input data samples from two or more neighboring cells maybe not be counted for the determination of an overlap percentage or used to determine the TA percentage in at least one distance range from the source cell center.

The distance ranges from the source cell center may be concentric bands (i.e., distance ranges of, for example, less than one kilometer from the source cell center, between equal to or greater than 1 KM and less than 1.5 KM from the source cell center or equal to or greater than 1.5 KM from the source cell center) in a predetermined distance from the source cell center. The distance ranges may be determined by the plurality of grids around the source cell center or by the Timing Advance Distribution (TAD) of TA KPI samples available for a source cell in a Performance Management Module (PMM).

In another embodiment, input samples of all predetermined geolocation may be used for the determination of an overlap percentage or used to determine the TA percentage in at least one distance range from the source cell center.

The determination of overlap percentage is determined by the ratio of the number of input data samples for the source cells throughout all predetermined geolocations of the grid (e.g., GL1 to GL20) and the total number of input data samples for the source cells plus the number of input data samples for the neighboring cells throughout all predetermined geolocations of the grid (e.g., GL1 to GL20). The input data of the source cell and the neighboring cells thereof can be separated by the Physical Cell Identity (PCI) of the cells at a predetermined GL.

Figure 2:
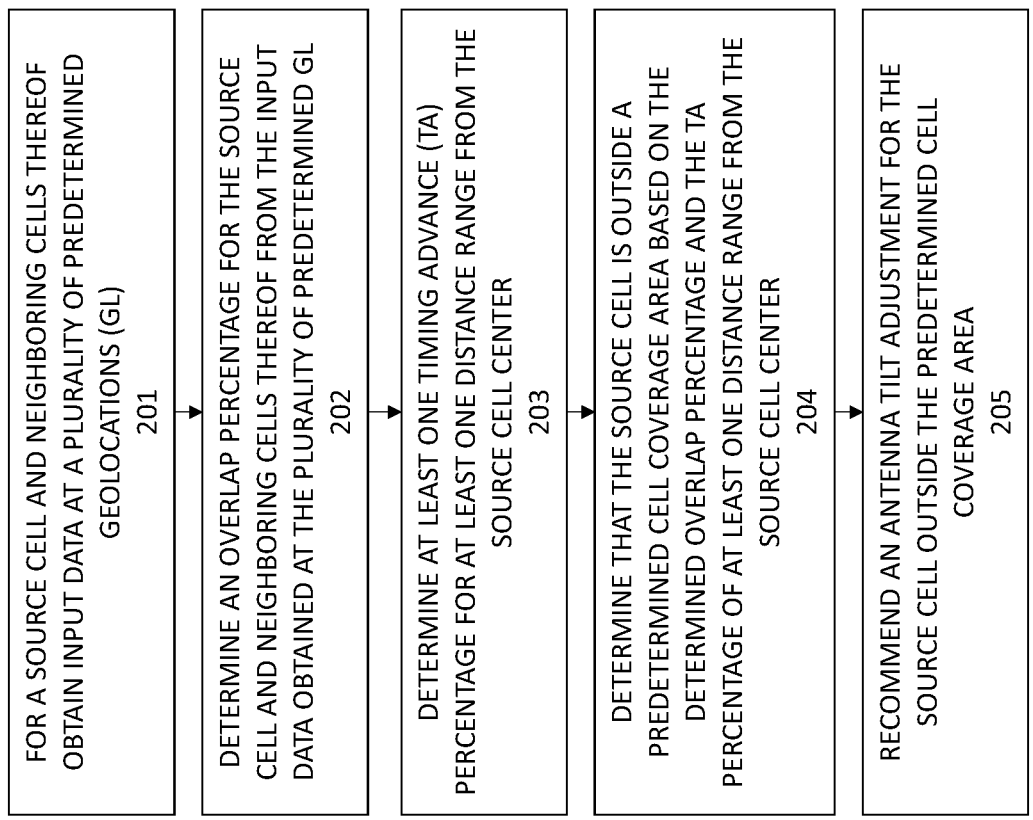
FIG. 2 illustrates the method for optimizing antenna tilt in a cell site in a radio access network (RAN) according to an embodiment.

FIG. 2 illustrates the method for optimizing antenna tilt in a cell site in a radio access network (RAN) according to an embodiment.

Referring to FIG. 2 in step 201, L3 data (i.e., layer 3, network layer data of the RAN) are collected by the test drive (i.e., obtained by at least one processor of the system for optimizing antenna tilt in a cell site of the RAN) from the source cell S1 and the neighboring cells thereof at a plurality of predetermined geolocations.

In step 202, for example, based one or more predetermined overlap conditions (e.g., a condition that a number of the neighboring cells is greater than or equal to two and/or a condition that a number of input data samples is greater than or equal to a predetermined number), the at least one processor of the system for optimizing antenna tilt in a cell site of the RAN determines the overlap percentage of the source cell and neighboring cells thereof from the input data obtained at the plurality of predetermined geolocations (e.g., the grid GL1 to GL20).

In an example embodiment, in step 202, the at least one processor of the system for optimizing antenna tilt in a cell site of the RAN may determine, for the source cell at a plurality of predetermined geolocations, a condition that a number of the neighboring cells is greater than or equal to two and/or a condition that a number of input data samples is greater than or equal to a predetermined number. In this case, the one or more predetermined overlap conditions are met, and the input data samples collected from the predetermined are eligible for further processing according to steps 203 to 205.

In another example embodiment, in case it is determined that the number of neighboring cells thereof is less than two neighboring cells, the input data samples collected from the predetermined geolocations may be not eligible for further processing and are discarded during the drive testing. The input data samples are used in steps 203 to 205.

In a further exemplary embodiment, the predetermined overlap condition may include input data samples collected from predetermined geolocations, wherein input data samples from only one neighboring cell can be obtained.

Alternatively, input data samples from predetermined geolocations, where only input data samples from the source can be obtained may be deemed eligible.

In step 203, at least one processor of the system for optimizing antenna tilt in a cell site of the RAN determines, for the source cell at least one timing advance (TA) percentage for at least one distance range from the source cell center (e.g., a first, a second and a third TA percentage in a predetermined first, second and third distance range, respectively).

In step 204, the at least one processor of the system for optimizing antenna tilt in a cell site of the RAN determines, based on the determination of the overlap percentage and the determination of the at least one TA percentage, that the source cell is outside a predetermined cell coverage area.

In step 205, the at least one processor of the system for optimizing antenna tilt in a cell site of the RAN recommends, based on the determining that the source cell is outside the predetermined cell coverage area, adjustment of the antenna tilt for the source cells to meet the predetermined cell coverage area (e.g., in case a source cell exceeds the predetermined cell coverage area a tilt-down for the cell site may be recommended or in case a source cell is a low dominance cell that fails to reach the predetermined cell coverage area a tilt-up for the cell site may be recommended).

Figure 3:
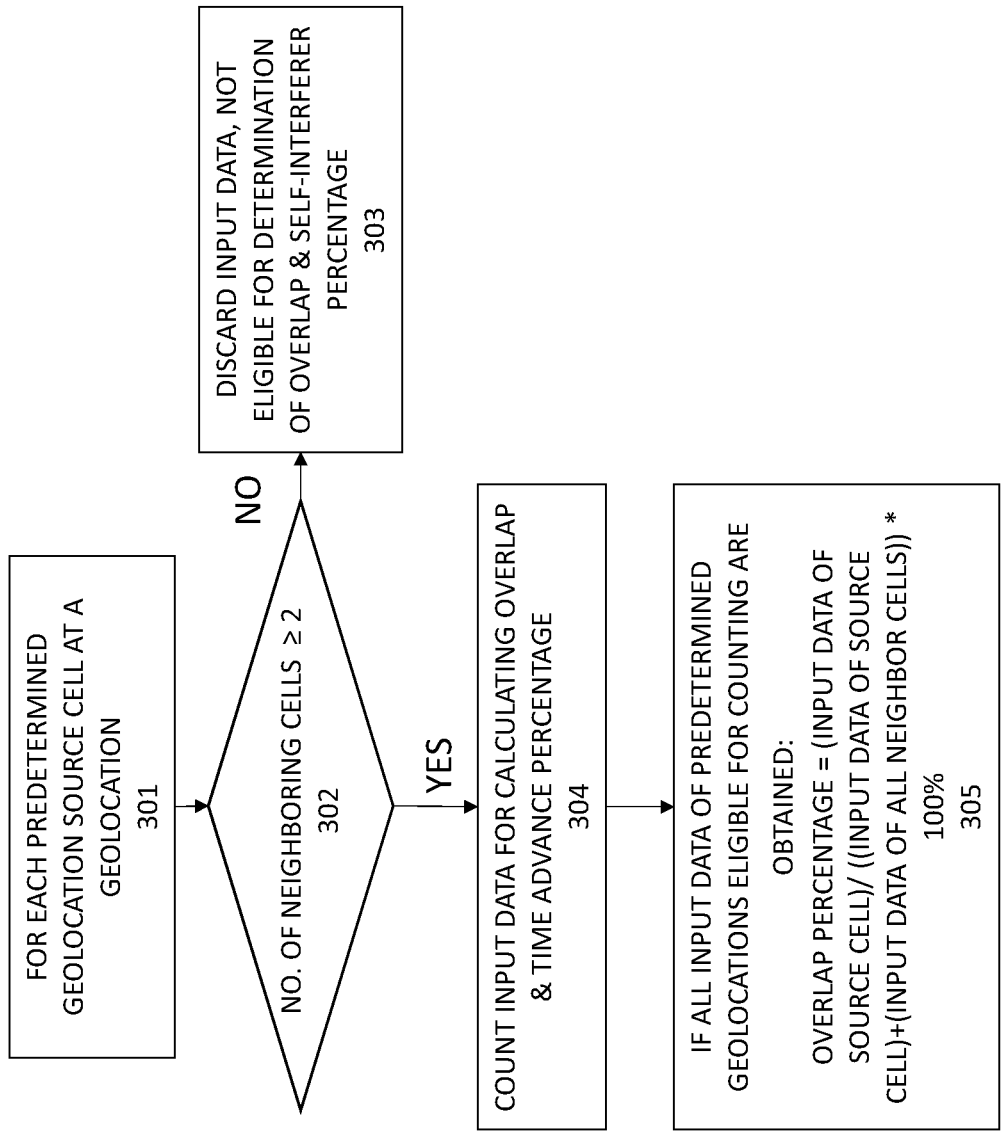
FIG. 3 illustrates the method for determining the overlap percentage for each source cell and neighboring cells at a plurality of predetermined geolocations according to an embodiment.

FIG. 3 illustrates the method for determining the overlap percentage for each source cell and neighboring cells at a plurality of predetermined geolocations according to an embodiment.

Referring to FIG. 3, in step 301, the at least one processor of the system for optimizing antenna tilt in a cell site of the RAN evaluates for the source cell at a plurality of predetermined geolocations, a condition that a number of the neighboring cells is greater than or equal to two and/or a condition that a number of input data samples is greater than or equal to a predetermined number. Based thereon in step 302, the at least one processor determines that the one or more predetermined overlap conditions are met.

In case the one or more predetermined overlap conditions are not met (NO in step 302), in step 303, the input data samples collected from the predetermined geolocations are not eligible for further processing and are discarded during the drive testing (i.e., the input data collected in said particular GLs will be not used to determine the overlap percentage and the TA advance percentage).

Based on the determination (YES in step 302), in step 303 the overlap percentage is calculated based on a ratio of a number of input data samples obtained for the source cell at the plurality of predetermined geolocations and a total number of input data samples may include the input data samples obtained for the source cell at the plurality of predetermined geolocations and input data samples obtained for the neighboring cells of the source cell at the plurality of predetermined geolocations. The input data of the source cell and the neighboring cells thereof can be separated by the Physical Cell Identity (PCI) of the cells at a predetermined GL.

Figure 4:
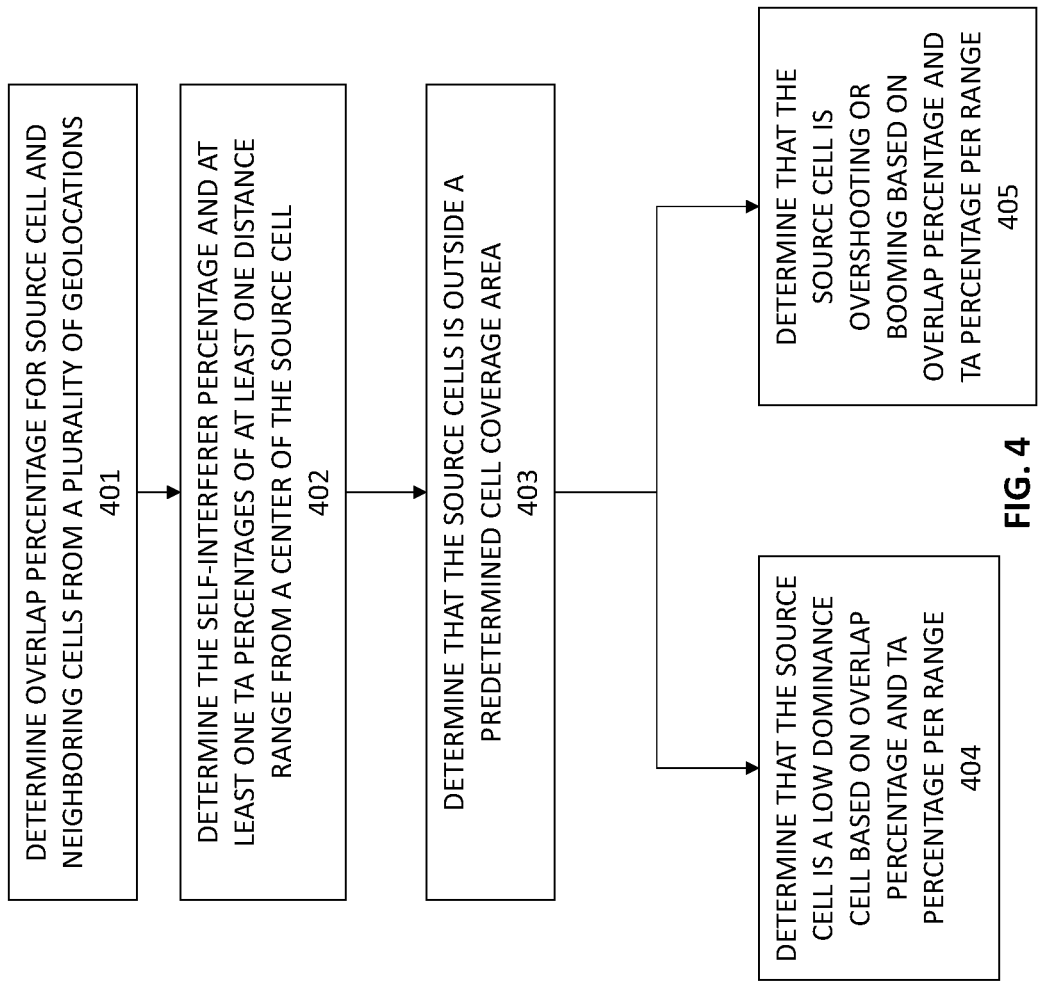
FIG. 4 illustrates the method for determining that the source cell is outside a predetermined cell coverage area.

FIG. 4 illustrates the method for determining that the source cell is outside a predetermined cell coverage area.

Referring to FIG. 4, in step 401, the overlap percentage is calculated based on a ratio of a number of input data samples obtained for the source cell at the plurality of predetermined geolocations and a total number of input data samples may include the input data samples obtained for the source cell at the plurality of predetermined geolocations and input data samples obtained for the neighboring cells of the source cell at the plurality of predetermined geolocations. The input data of the source cell and the neighboring cells thereof can be separated by the Physical Cell Identity (PCI) of the cells at a predetermined GL.

In step 402, the at least one processor of the system for optimizing antenna tilt in a cell site of the RAN determines the (TA) percentage for at least one distance range from the center of the source cell (i.e., determines the TA percentages of TA KPI sample data in at least one predetermined distance range from the center of the source cell at a predetermined geolocation, for example, from the Timing Advance Distribution (TAD) of TA KPI samples available for a source cell in the PMM). According to an example embodiment, the determination may include: calculating a first TA percentage based on TA data from TA data samples obtained within a first distance range from the center of the source cell; calculating a second TA percentage based on TA data from TA data samples obtained within a second distance range from the center of the source cell; calculating a third TA percentage based on TA data from TA data samples obtained within in a third distance range from the center of the source cell.

In step 403, based on the results of steps 402 and step 403 determine, the at least one processor of the system for optimizing antenna tilt in a cell site of the RAN determines that the source cell is outside the predetermined cell coverage area.

In step 404, the at least one processor determines that the source cell exceeds the predetermined cell coverage area based on: the calculated third TA percentage is greater than 50%; the calculated overlap percentage is greater than 20%; and the calculated second TA percentage is greater than 2% (i.e., a self-interferer percentage is greater than 2%).

Moreover, in step 404, the at least one processor may recommend an antenna down-tilt, for the source cell determined to exceed the predetermined cell coverage area, in case an electrical tilt is below a maximum value (i.e., in case an electrical tilt below a maximum value is available)

In step 405, the at least one processor determining that the source cell is a low dominance cell that fails to reach the predetermined cell coverage area based on: the calculated first TA percentage is greater than 50%; the calculated overlap percentage is greater than 30%; and the calculated second TA percentage is greater than 2% (i.e., the self-interferer percentage is more than 2%).

Moreover, in step 405, the at least one processor may recommend an antenna up-tilt, for the source cell determined to be the low dominance cell, in case an electrical tilt is above a minimum value.

Figure 5:
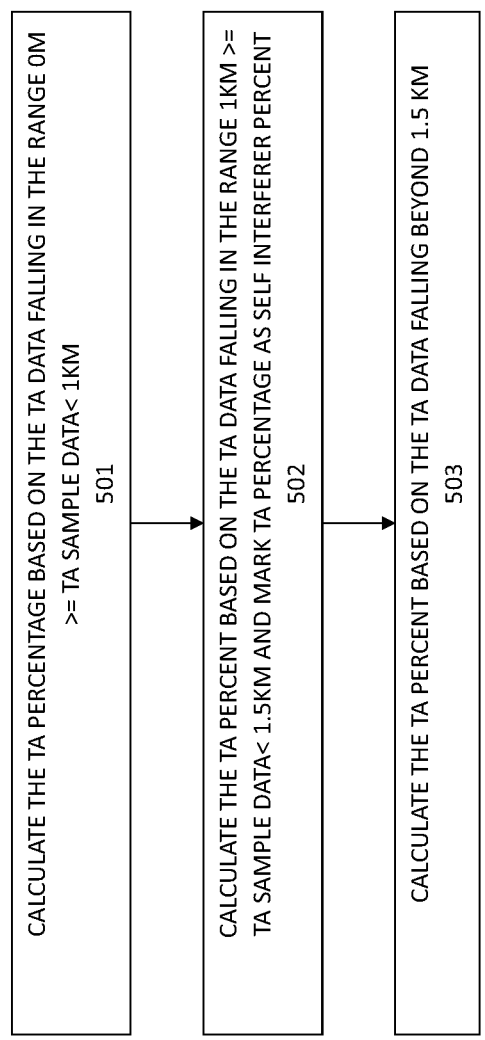
FIG. 5 illustrates the method for determining, based on TA sample data conditions, at least one TA percentage of a source cell in at least one distance range from a source cell center according to an embodiment.

FIG. 5 illustrates the method for determining at least one TA percentage of a source cell in at least one distance range from a center of the source cell according to an embodiment.

Referring to FIG. 5, in step 501, the at least one processor of the system for optimizing antenna tilt in a cell site of the RAN calculates the first TA percentage based on TA data from TA data samples obtained within the first distance range from the center of the source cell, wherein the first distance range is between the center of the source cell and less than one kilometer from the center of the source cell.

Moreover, in step 502, the at least one processor calculates the second TA percentage based on TA data from TA data samples obtained within the second distance range from the center of the source cell and marks the TA percentage as the self-interferer percentage, wherein the second distance range is equal to or greater than one KM from the center of the source cell and less than 1.5 KM from the center of the source cell.

Furthermore, in step 503, the at least one processor calculates the third TA percentage based on TA data from TA data samples obtained within a third distance range from the center of the source cell, wherein the third distance range is equal to or greater than 1.5 KM from the center of the source cell.

Figure 6:
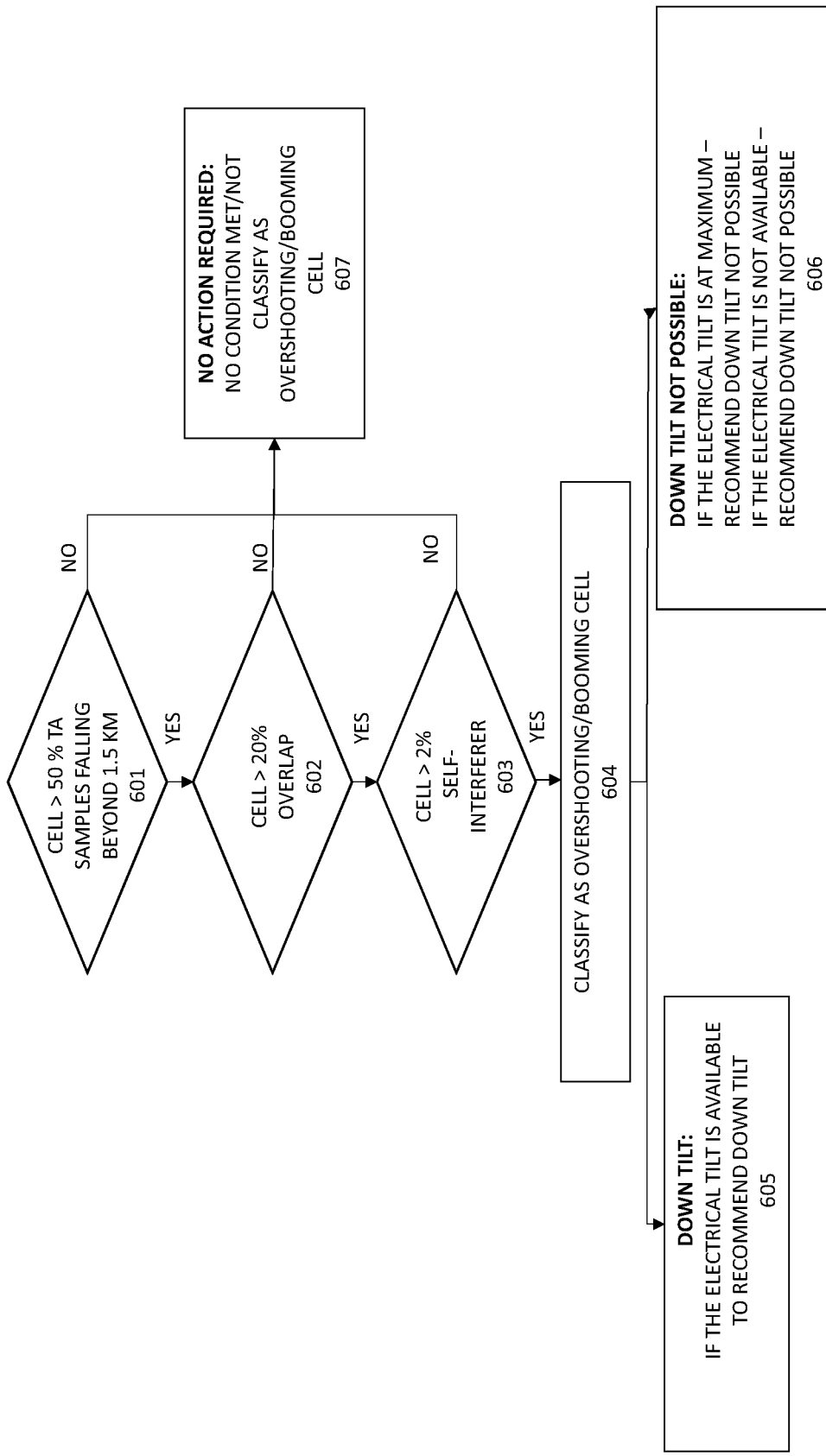
FIG. 6 shows classification conditions and the tilt-down recommendations for an overshooting or booming source cell.

FIG. 6 shows classification conditions and the tilt-down recommendations for an overshooting and/or booming source cell.

Referring to FIG. 6, a cell site is deemed (i.e., classified as) to exceed (i.e., overshooting/booming) the predefined cell coverage area in case all conditions in steps 601 to 603 are met. In step 601, the cell site (source cell) should have more than 50% TA samples falling in a distance band greater than 1.5 KM from the center of the source cell. In step 602, the cell site (i.e., the source cell) should have a calculated overlap percentage of more than 20%. In step 603, the cell site should have a calculated self-interferer percentage more than 2% (i.e., more than 2% TA samples percentage falling in a distance band equal to or greater than 1 KM and less than 1.5 KM from the center of the source cell or equal to or greater than 1.5 KM from the center of the source cell).

Still referring to FIG. 6, in step 604, a cell site (source cell) is classified as to exceed (i.e., overshoot) the predefined cell coverage area if all conditions according to steps 601 to 603 are met. In step 605, the method or system enables a recommendation to adjust the antenna tilt in the cell site to down tilt.

In an example embodiment, in step 605, in case an electrical tilt to adjust the antenna tilt in the cell site is available, the method or system provides a recommendation to down tilt is provided to the cell site (i.e., a recommendation to down tilt to an E2-node or an O-RU of the cell site to implement the down tilt of the antenna).

In another example embodiment, in step 606, in case the electrical tilt is at maximum a recommendation to down tilt the antenna in a cell site is not possible. For example, an electrical tilt of an antenna may have 18 levels of azimuth tilt, wherein the zero level is a maximum vertical down tilt level, and the $18^{th}$ level is a minimum horizontal up tilt value. To this end, in case the electrical tilt is at the zero level no more down tilt is possible and no recommendation to down tilt is possible anymore.

In another example embodiment, in step 606, if no electrical tilt is available in the cell site, the method or system cannot provide a recommendation to down tilt to the cell site (i.e., no tilt down recommendation can be provided to the E2-node or the O-RU of the cell site to implement the down tilt). In step 607, no action is taken if neither of the conditions according to steps 601 to 603 are met.

Figure 7:
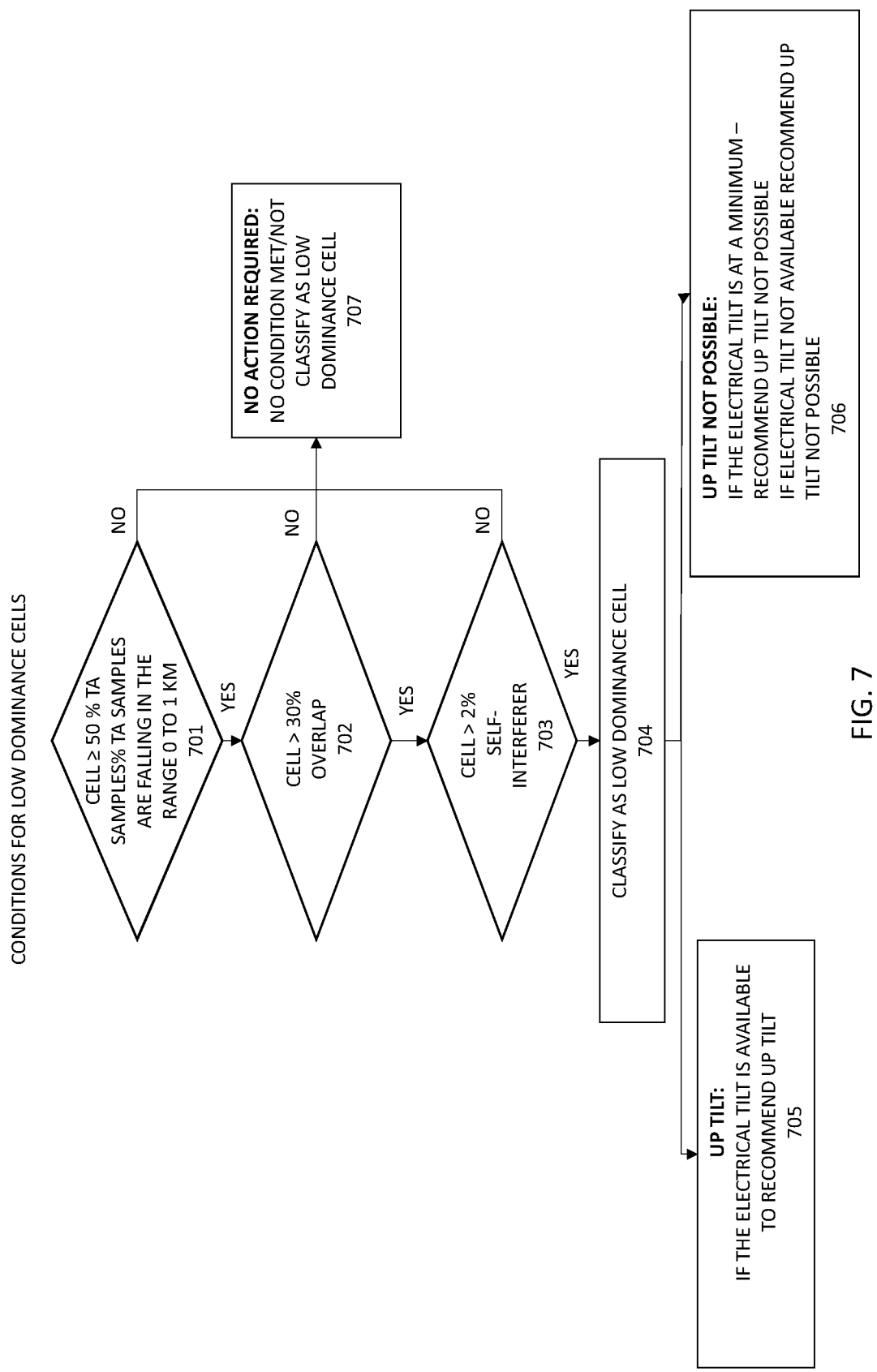
FIG. 7 shows classification conditions and the tilt-up recommendations for a low domination cell.

FIG. 7 shows classification conditions and the tilt-up recommendations for low domination cell sites. Referring to FIG. 7, a cell site is deemed (i.e., classified as) being below the predefined cell coverage area in the RAN (i.e., a low dominance cell site) in case all conditions in steps 701 to 703 are met. In step 701, the cell site (source cell) should have more than 50% TA samples falling in a distance band between 0 KM (center of the source cell) and less than 1 KM from the center of the source cell. In step 702, the cell site (i.e., the source cell) should have a calculated overlap percentage of more than 30%. In step 703, the cell site should have a calculated self-interferer percentage more than 2% (i.e., more than 2% TA samples percentage falling in a distance band equal to or greater than 1 KM and less than 1.5 KM from the center of the source cell or equal to or greater than 1.5 KM from the center of the source cell).

Still referring to FIG. 7, in step 704, a cell site (source cell) is classified as being below the predefined cell coverage area (i.e., a low dominance cell site) in case all conditions according to steps 701 to 703 are met. In step 705, the method or system enables a recommendation to adjust the antenna tilt in the cell site to up tilt.

In an example embodiment, in step 705, in case an electrical tilt to adjust the antenna tilt in the cell site is available the method or system provides a recommendation to up tilt is provided to the cell site (i.e., a recommendation to up tilt to an E2-node or an O-RU of the cell site to implement the up tilt of the antenna).

In another example embodiment, in step 706, in case the electrical tilt is at minimum a recommendation to down-tilt the antenna in a cell site is not possible. For example, the electrical tilt of the antenna may have 18 levels of azimuth tilt, wherein the zero level is the maximum vertical down tilt level, and the $18^{th}$ level is the minimum horizontal up tilt value. To this end, in case the electrical tilt is at the $18^{th}$ level no more up-tilt is possible beyond the minimum horizontal up-tilt value and no recommendation to up-tilt is possible anymore.

In another example embodiment, in step 706, if no electrical tilt is available in the cell site, the method or system cannot provide a recommendation to up tilt to the cell site (i.e., no tilt-up recommendation can be provided to the E2-node or the O-RU of the cell site to implement the up tilt).

Moreover, in case the percentage of TA samples falling the distinct distance ranges does not meet conditions in step 701, the calculated overlap percentage in conditions in step 702 and the self-interferer percentage in step 703, no action is required (i.e., no recommendation is provided) according to step 707. As a result, the cell site is within the predetermined coverage area of the RAN and no antenna tilt adjustment is needed.

In an example embodiment, in case either the driving test data (DT) or TA sample data cannot be obtained a classification cannot be commenced and the method optimizing antenna tilt in a cell site in the RAN may be reset.

Figure 8:
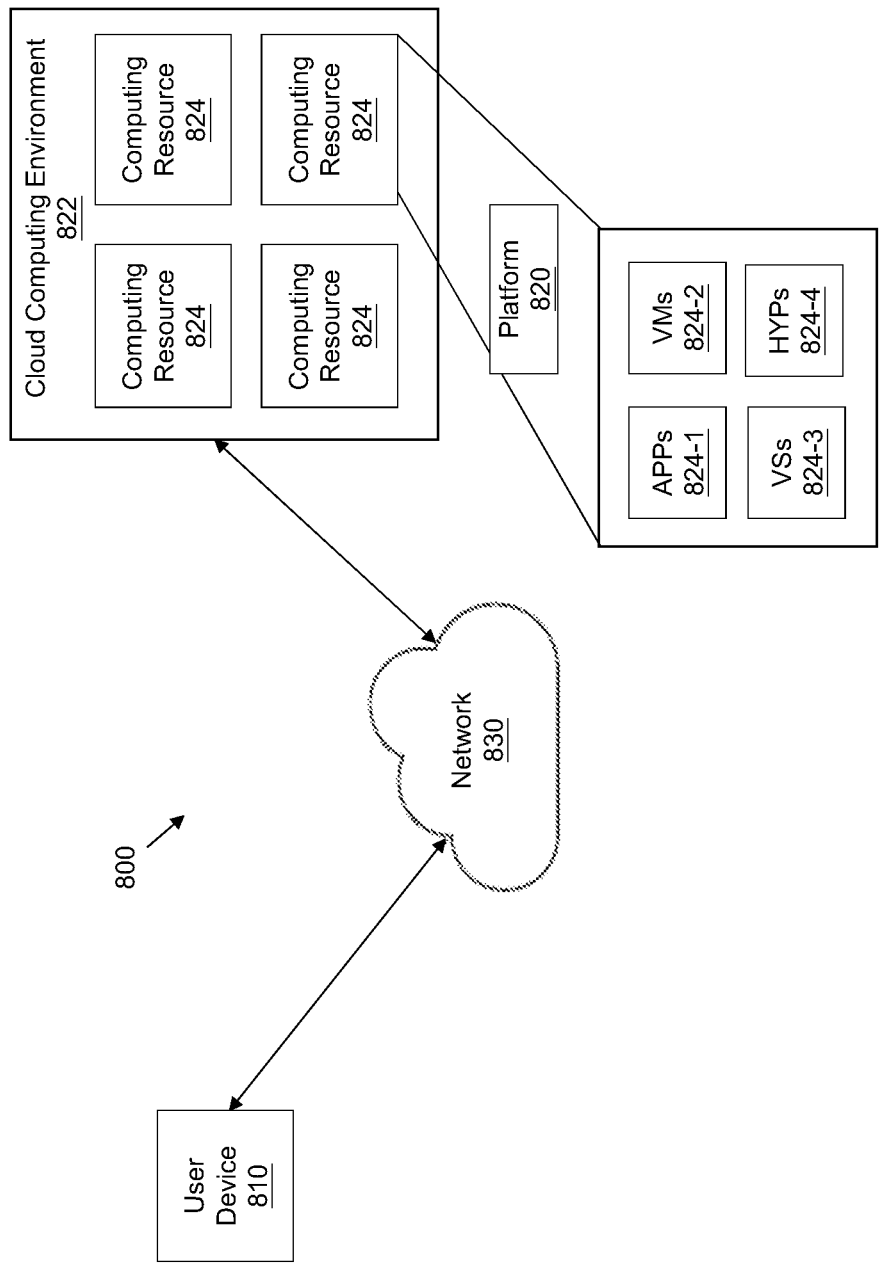
FIG. 8 is a diagram of an example environment in which systems and/or methods, described herein, may be implemented.

FIG. 8 is a diagram of an example environment 800 in which systems and/or methods, described herein, may be implemented. As shown in FIG. 8, environment 800 may include a user device 810, a platform 820, and a network 830. Devices of environment 800 may interconnect via wired connections, wireless connections, or a combination of wired and wireless connections. In embodiments, any of the functions and operations described with reference to FIG. 1 above may be performed by any combination of elements illustrated in FIG. 8.

User device 810 includes one or more devices capable of receiving, generating, storing, processing, and/or providing information associated with platform 820. For example, user device 810 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 810 may receive information from and/or transmit information to platform 820.

Platform 820 includes one or more devices capable of receiving, generating, storing, processing, and/or providing information. In some implementations, platform 820 may include a cloud server or a group of cloud servers. In some implementations, platform 820 may be designed to be modular such that certain software components may be swapped in or out depending on a particular need. As such, platform 820 may be easily and/or quickly reconfigured for different uses.

In some implementations, as shown, platform 820 may be hosted in cloud computing environment 822. Notably, while implementations described herein describe platform 820 as being hosted in cloud computing environment 822, in some implementations, platform 820 may not be cloud-based (i.e., may be implemented outside of a cloud computing environment) or may be partially cloud-based.

Cloud computing environment 822 includes an environment that hosts platform 820. Cloud computing environment 822 may provide computation, software, data access, storage, etc., services that do not require end-user (e.g., user device 810) knowledge of a physical location and configuration of system(s) and/or device(s) that hosts platform 820. As shown, cloud computing environment 822 may include a group of computing resources 824 (referred to collectively as "computing resources 824" and individually as "computing resource 824").

Computing resource 824 includes one or more personal computers, a cluster of computing devices, workstation computers, server devices, or other types of computation and/or communication devices. In some implementations, computing resource 824 may host platform 820. The cloud resources may include compute instances executing in computing resource 824, storage devices provided in computing resource 824, data transfer devices provided by computing resource 824, etc. In some implementations, computing resource 824 may communicate with other computing resources 824 via wired connections, wireless connections, or a combination of wired and wireless connections.

As further shown in FIG. 8, computing resource 824 includes a group of cloud resources, such as one or more applications ("APPs") 824-1, one or more virtual machines ("VMs") 824-2, virtualized storage ("VSs") 824-3, one or more hypervisors ("HYPs") 824-4, or the like.

Application 824-1 includes one or more software applications that may be provided to or accessed by user device 810. Application 824-1 may eliminate a need to install and execute the software applications on user device 810. For example, application 824-1 may include software associated with platform 820 and/or any other software capable of being provided via cloud computing environment 822. In some implementations, one application 824-1 may send/receive information to/from one or more other applications 824-1, via virtual machine 824-2.

Virtual machine 824-2 includes a software implementation of a machine (e.g., a computer) that executes programs like a physical machine. Virtual machine 824-2 may be either a system virtual machine or a process virtual machine, depending upon use and degree of correspondence to any real machine by virtual machine 824-2. A system virtual machine may provide a complete system platform that supports execution of a complete operating system ("OS"). A process virtual machine may execute a single program, and may support a single process. In some implementations, virtual machine 824-2 may execute on behalf of a user (e.g., user device 810), and may manage infrastructure of cloud computing environment 822, such as data management, synchronization, or long-duration data transfers.

Virtualized storage 824-3 includes one or more storage systems and/or one or more devices that use virtualization techniques within the storage systems or devices of computing resource 824. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 824-4 may provide hardware virtualization techniques that allow multiple operating systems (e.g., "guest operating systems") to execute concurrently on a host computer, such as computing resource 824. Hypervisor 824-4 may present a virtual operating platform to the guest operating systems, and may manage the execution of the guest operating systems. Multiple instances of a variety of operating systems may share virtualized hardware resources.

Network 830 includes one or more wired and/or wireless networks. For example, network 830 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of environment 800 may perform one or more functions described as being performed by another set of devices of environment 800.

Figure 9:
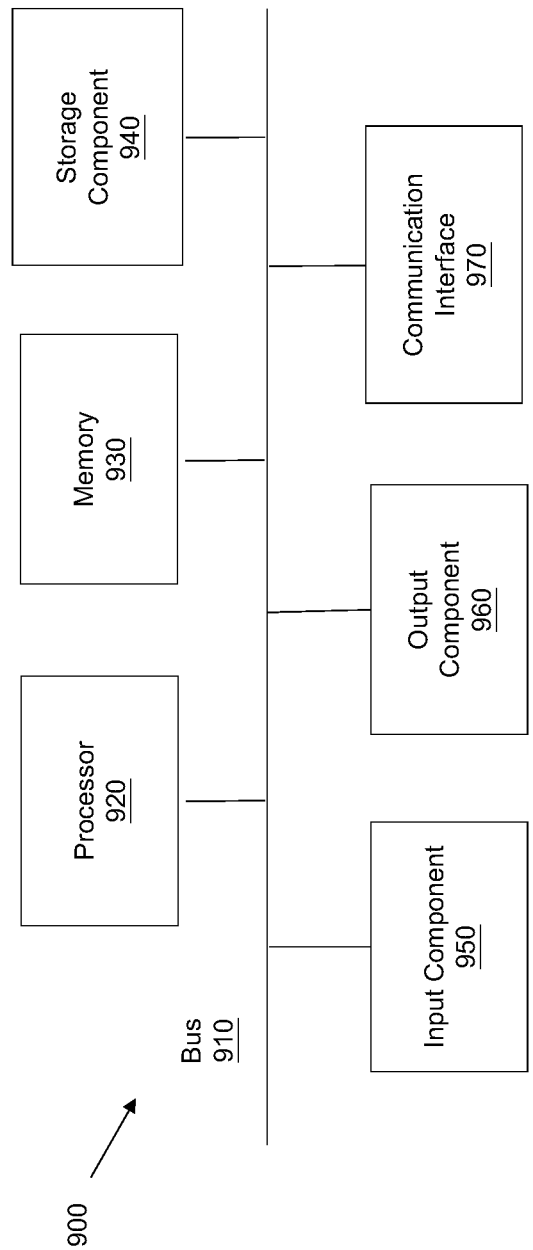
FIG. 9 is a diagram of example components of a device according to an embodiment.

FIG. 9 is a diagram of example components of a device 900. Device 900 may correspond to user device 810 and/or platform 820. As shown in FIG. 9, device 900 may include a bus 910, a processor 920, a memory 930, a storage component 940, an input component 950, an output component 960, and a communication interface 970.

Bus 910 includes a component that permits communication among the components of device 900. Processor 920 may be implemented in hardware, firmware, or a combination of hardware and software. Processor 920 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 920 includes one or more processors capable of being programmed to perform a function. Memory 930 includes a random access memory (RAM), a read only memory (ROM), and/or another type of dynamic or static storage device (e.g., a flash memory, a magnetic memory, and/or an optical memory) that stores information and/or instructions for use by processor 920.

Storage component 940 stores information and/or software related to the operation and use of device 900. For example, storage component 940 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 950 includes a component that permits device 900 to receive information, such as via user input (e.g., a touch screen display, a keyboard, a keypad, a mouse, a button, a switch, and/or a microphone). Additionally, or alternatively, input component 950 may include a sensor for sensing information (e.g., a global positioning system (GPS) component, an accelerometer, a gyroscope, and/or an actuator). Output component 960 includes a component that provides output information from device 900 (e.g., a display, a speaker, and/or one or more light-emitting diodes (LEDs)).

Communication interface 970 includes a transceiver-like component (e.g., a transceiver and/or a separate receiver and transmitter) that enables device 900 to communicate with other devices, such as via a wired connection, a wireless connection, or a combination of wired and wireless connections. Communication interface 970 may permit device 900 to receive information from another device and/or provide information to another device. For example, communication interface 970 may include an Ethernet interface, an optical interface, a coaxial interface, an infrared interface, a radio frequency (RF) interface, a universal serial bus (USB) interface, a Wi-Fi interface, a cellular network interface, or the like.

Device 900 may perform one or more processes described herein. Device 900 may perform these processes in response to processor 920 executing software instructions stored by a non-transitory computer-readable medium, such as memory 930 and/or storage component 940. A computer-readable medium is defined herein as a non-transitory memory device. A memory device includes memory space within a single physical storage device or memory space spread across multiple physical storage devices.

Software instructions may be read into memory 930 and/or storage component 940 from another computer-readable medium or from another device via communication interface 970. When executed, software instructions stored in memory 930 and/or storage component 940 may cause processor 920 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software. The number and arrangement of components shown in FIG. 9 are provided as an example. In practice, device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

In embodiments, any one of the operations or processes of FIGS. 1 to 7 may be implemented by or using any one of the elements illustrated in FIGS. 8 and 9. It is understood that other embodiments are not limited thereto, and may be implemented in a variety of different architectures (e.g., bare metal architecture, any cloud-based architecture or deployment architecture such as Kubernetes, Docker, OpenStack, etc.).

According to embodiments, a system for optimizing antenna tilt in a cell site of a radio access network (RAN), the system includes: a memory storing instructions; and at least one processor configured to execute the instructions to: obtain input data for a source cell and for neighboring cells thereof at a plurality of predetermined geolocations; determine an overlap percentage of the source cell and the neighboring cells thereof from the input data obtained at the plurality of predetermined geolocations; determine, for the source cell, at least one TA percentage for at least one distance range from a center of the source cell; determine, based on the determined overlap percentage and the determined at least one TA percentage, that the source cell is outside a predetermined cell coverage area; and recommend, based on the determining that the source cell is outside the predetermined cell coverage area, adjustment of the antenna tilt for the source cell to meet the predetermined cell coverage area.

The overlap percentage may be determined based on one or more predetermined overlap conditions, the one or more predetermined overlap conditions may include at least one of: a condition that a number of the neighboring cells is greater than or equal to two; and a condition that a number of input data samples is greater than or equal to a predetermined number.

The overlap percentage may be calculated based on a ratio of a number of input data samples obtained for the source cell at the plurality of predetermined geolocations and a total number of input data samples may include the input data samples obtained for the source cell at the plurality of predetermined geolocations and input data samples obtained for the neighboring cells of the source cell at the plurality of predetermined geolocations.

In determining the at least one timing advance (TA) percentage for the at least one distance range from the center of the source cell, the at least one processor may be configured to execute the instructions to: calculate a first TA percentage based on TA data from TA data samples obtained within a first distance range from the center of the source cell; calculate a second TA percentage based on TA data from TA data samples obtained within a second distance range from the center of the source cell; calculate a third TA percentage based on TA data from TA data samples obtained within in a third distance range from the center of the source cell.

In determining that the source cell is outside the predetermined cell coverage area, the at least one processor may be further configured to execute the instructions to: determine that the source cell exceeds the predetermined cell coverage area based on: the calculated third TA percentage is greater than 50%; the calculated overlap percentage is greater than 20%; and the calculated second TA percentage is greater than 2%; and recommend antenna down-tilt, for the source cell determined to exceed the predetermined cell coverage area, in case an electrical tilt is below a maximum value.

In determining that the source cell is outside the predetermined cell coverage area, the at least one processor may be further configured to execute the instructions to: determining that the source cell is a low dominance cell that fails to reach the predetermined cell coverage area based on: the calculated first TA percentage is greater than 50%; the calculated overlap percentage is greater than 30%; and the calculated second TA percentage is greater than 2%; and recommend antenna up-tilt, for the source cell determined to be the low dominance cell, in case an electrical tilt is above a minimum value.

The first distance range is between the center of the source cell and less than one kilometer (KM) from the center of the source cell; wherein the second distance range is equal to or greater than one KM from the center of the source cell and less than 1.5 KM from the center of the source cell; wherein the third distance range is equal to or greater than 1.5 KM from the center of the source cell.

According to embodiments, a method for optimizing antenna tilt in a cell site of a radio access network (RAN), the method includes: obtaining, via a processor, input data for a source cell and for neighboring cells thereof at a plurality of predetermined geolocations; determining, via the processor, an overlap percentage of the source cell and the neighboring cells thereof from the input data obtained at the plurality of predetermined geolocations; determining, via the processor, for the source cell, at least one TA percentage for at least one distance range from a center of the source cell; determining, via the processor, based on the determined overlap percentage and the determined at least one TA percentage, that the source cell is outside a predetermined cell coverage area; and recommending, via the processor, based on the determining that the source cell is outside the predetermined cell coverage area, adjustment of the antenna tilt for the source cell to meet the predetermined cell coverage area.

The overlap percentage may be determined based on one or more predetermined overlap conditions, the one or more predetermined overlap conditions may include at least one of: a condition that a number of the neighboring cells is greater than or equal to two; and a condition that a number of input data samples is greater than or equal to a predetermined number.

The overlap percentage may be calculated based on a ratio of a number of input data samples obtained for the source cell at the plurality of predetermined geolocations and a total number of input data samples may include the input data samples obtained for the source cell at the plurality of predetermined geolocations and input data samples obtained for the neighboring cells of the source cell at the plurality of predetermined geolocations.

The determining the at least one TA percentage may include: calculating, via the processor, a first TA percentage based on TA data from TA data samples obtained within a first distance range from the center of the source cell; calculating, via the processor, a second TA percentage based on TA data from TA data samples obtained within a second distance range from the center of the source cell; calculating, via the processor, a third TA percentage based on TA data from TA data samples obtained within in a third distance range from the center of the source cell.

The determining the source cell is outside the predetermined overage area may include: determining, via the processor, that the source cell exceeds the predetermined cell coverage area based on: the calculated third TA percentage is greater than 50%; the calculated overlap percentage is greater than 20%; and the calculated second TA percentage is greater than 2%; and wherein the recommending the adjustment of the antenna tilt may include recommending antenna down-tilt, for the source cell determined to exceed the predetermined cell coverage area, in case an electrical tilt is below a maximum value.

The determining the source cell is outside the predetermined overage area may include: determining, via the processor, that the source cell is a low dominance cell that fails to reach the predetermined cell coverage area based on: the calculated first TA percentage is greater than 50%; the calculated overlap percentage is greater than 30%; and the calculated second TA percentage is greater than 2%; and wherein the recommending the adjustment of the antenna tilt may include antenna up-tilt, for the source cell determined to be the low dominance cell, in case an electrical tilt is above a minimum value.

The first distance range is between the center of the source cell and less than one kilometer (KM) from the center of the source cell; wherein the second distance range is equal to or greater than one KM from the center of the source cell and less than 1.5 KM from the center of the source cell; wherein the third distance range is equal to or greater than 1.5 KM from the center of the source cell.

According to embodiments, a non-transitory computer-readable recording medium having recorded thereon instructions executable by at least one processor configured to perform a method for optimizing antenna tilt in a cell site of a radio access network (RAN), the method includes: obtaining input data for a source cell and for neighboring cells thereof at a plurality of predetermined geolocations; determining an overlap percentage of the source cell and the neighboring cells thereof from the input data obtained at the plurality of predetermined geolocations; determining, for the source cell, at least one TA percentage for at least one distance range from a center of the source cell; determining, based on the determined overlap percentage and the determined at least one TA percentage, that the source cell is outside a predetermined cell coverage area; and recommending, based on the determining that the source cell is outside the predetermined cell coverage area, adjustment of the antenna tilt for the source cell to meet the predetermined cell coverage area.

The overlap percentage may be determined based on one or more predetermined overlap conditions, the one or more predetermined overlap conditions may include at least one of: a condition that a number of the neighboring cells is greater than or equal to two; and a condition that a number of input data samples is greater than or equal to a predetermined number.

The overlap percentage may be calculated based on a ratio of a number of input data samples obtained for the source cell at the plurality of predetermined geolocations and a total number of input data samples may include the input data samples obtained for the source cell at the plurality of predetermined geolocations and input data samples obtained for the neighboring cells of the source cell at the plurality of predetermined geolocations.

The determining the at least one TA percentage may include: calculating a first TA percentage based on TA data from TA data samples obtained within a first distance range from the center of the source cell; calculating a second TA percentage based on TA data from TA data samples obtained within a second distance range from the center of the source cell; calculating a third TA percentage based on TA data from TA data samples obtained within in a third distance range from the center of the source cell.

The determining the source cell is outside the predetermined overage area may include: determining that the source cell exceeds the predetermined cell coverage area based on: the calculated third TA percentage is greater than 50%; the calculated overlap percentage is greater than 20%; and the calculated second TA percentage is greater than 2%; and wherein the recommending the adjustment of the antenna tilt may include recommending antenna down-tilt, for the source cell determined to exceed the predetermined cell coverage area, in case an electrical tilt is below a maximum value.

The determining the source cell is outside the predetermined overage area may include: determining that the source cell is a low dominance cell that fails to reach the predetermined cell coverage area based on: the calculated first TA percentage is greater than 50%; the calculated overlap percentage is greater than 30%; and the calculated second TA percentage is greater than 2%; and wherein the recommending the adjustment of the antenna tilt may include antenna up-tilt, for the source cell determined to be the low dominance cell, in case an electrical tilt is above a minimum value.

According to the example embodiments, systems and method realize an optimization of antenna tilt in a cell site of a radio access network (RAN) based on predetermined conditions including an overlap percentage and Timing Advance (TA) percentages of TA Key Performance Indicator (KPI) sample data in at least one predetermined distance range from the cell center of a source cell at a predetermined geolocation (i.e., Timing Advance Distribution (TAD) of TA KPI samples available for a source cell in a Performance Management Module (PMM)). As a result, a source cell that exceeds the defined cell coverage area can be recommended to tilt down and a source cell that has a low cell coverage area below the defined cell coverage area can be recommended to tilt up in order to realize an improvement of overall performance and capacity of cells in the RAN.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system for optimizing antenna tilt in a cell site of a radio access network (RAN), the system comprising:
    a memory storing instructions; and
    at least one processor configured to execute the instructions to:
        obtain input data for a source cell and for neighboring cells thereof at a plurality of predetermined geolocations;
        determine an overlap percentage of the source cell and the neighboring cells thereof from the input data obtained at the plurality of predetermined geolocations;
        determine, for the source cell, at least one TA percentage for at least one distance range from a center of the source cell;
        determine, based on the determined overlap percentage and the determined at least one TA percentage, that the source cell is outside a predetermined cell coverage area; and
        recommend, based on the determining that the source cell is outside the predetermined cell coverage area, adjustment of the antenna tilt for the source cell to meet the predetermined cell coverage area.

2. The system as claimed in claim 1, wherein the overlap percentage is determined based on one or more predetermined overlap conditions, the one or more predetermined overlap conditions comprising at least one of:
    a condition that a number of the neighboring cells is greater than or equal to two; and
    a condition that a number of input data samples is greater than or equal to a predetermined number.

3. The system as claimed in claim 1, wherein the overlap percentage is calculated based on a ratio of a number of input data samples obtained for the source cell at the plurality of predetermined geolocations and a total number of input data samples comprising the input data samples obtained for the source cell at the plurality of predetermined geolocations and input data samples obtained for the neighboring cells of the source cell at the plurality of predetermined geolocations.

4. The system as claimed in claim 1, wherein, in determining the at least one timing advance (TA) percentage for the at least one distance range from the center of the source cell, the at least one processor is configured to execute the instructions to:
    calculate a first TA percentage based on TA data from TA data samples obtained within a first distance range from the center of the source cell;
    calculate a second TA percentage based on TA data from TA data samples obtained within a second distance range from the center of the source cell;
    calculate a third TA percentage based on TA data from TA data samples obtained within in a third distance range from the center of the source cell.

5. The system as claimed in claim 4, wherein in determining that the source cell is outside the predetermined cell coverage area, the at least one processor is further configured to execute the instructions to:
    determine that the source cell exceeds the predetermined cell coverage area based on:
        the calculated third TA percentage is greater than 50%;
        the calculated overlap percentage is greater than 20%; and
        the calculated second TA percentage is greater than 2%; and
    recommend antenna down-tilt, for the source cell determined to exceed the predetermined cell coverage area, in case an electrical tilt is below a maximum value.

6. The system as claimed in claim 4, wherein in determining that the source cell is outside the predetermined cell coverage area, the at least one processor is further configured to execute the instructions to:
    determining that the source cell is a low dominance cell that fails to reach the predetermined cell coverage area based on:
        the calculated first TA percentage is greater than 50%;
        the calculated overlap percentage is greater than 30%; and
        the calculated second TA percentage is greater than 2%; and
    recommend antenna up-tilt, for the source cell determined to be the low dominance cell, in case an electrical tilt is above a minimum value.

7. The system as claimed in claim 4,
    wherein the first distance range is between the center of the source cell and less than one kilometer (KM) from the center of the source cell;
    wherein the second distance range is equal to or greater than one KM from the center of the source cell and less than 1.5 KM from the center of the source cell;
    wherein the third distance range is equal to or greater than 1.5 KM from the center of the source cell.

8. A method for optimizing antenna tilt in a cell site of a radio access network (RAN), the method comprising:

obtaining, via a processor, input data for a source cell and for neighboring cells thereof at a plurality of predetermined geolocations;

determining, via the processor an overlap percentage of the source cell and the neighboring cells thereof from the input data obtained at the plurality of predetermined geolocations;

determining, via the processor, for the source cell, at least one TA percentage for at least one distance range from a center of the source cell;

determining, via the processor, based on the determined overlap percentage and the determined at least one TA percentage, that the source cell is outside a predetermined cell coverage area; and recommending, via the processor, based on the determining that the source cell is outside the predetermined cell coverage area, adjustment of the antenna tilt for the source cell to meet the predetermined cell coverage area.

9. The method as claimed in claim 8, wherein the overlap percentage is determined based on one or more predetermined overlap conditions, the one or more predetermined overlap conditions comprising at least one of:
a condition that a number of the neighboring cells is greater than or equal to two; and
a condition that a number of input data samples is greater than or equal to a predetermined number.

10. The method as claimed in claim 8, wherein the overlap percentage is calculated based on a ratio of a number of input data samples obtained for the source cell at the plurality of predetermined geolocations and a total number of input data samples comprising the input data samples obtained for the source cell at the plurality of predetermined geolocations and input data samples obtained for the neighboring cells of the source cell at the plurality of predetermined geolocations.

11. The method as claimed in claim 8, wherein the determining the at least one TA percentage comprises:
calculating, via the processor, a first TA percentage based on TA data from TA data samples obtained within a first distance range from the center of the source cell;
calculating, via the processor, a second TA percentage based on TA data from TA data samples obtained within a second distance range from the center of the source cell;
calculating, via the processor, a third TA percentage based on TA data from TA data samples obtained within in a third distance range from the center of the source cell.

12. The method as claimed in claim 11, wherein the determining the source cell is outside the predetermined overage area comprises:
determining, via the processor, that the source cell exceeds the predetermined cell coverage area based on:
the calculated third TA percentage is greater than 50%;
the calculated overlap percentage is greater than 20%; and
the calculated second TA percentage is greater than 2%; and
wherein the recommending the adjustment of the antenna tilt comprises recommending antenna down-tilt, for the source cell determined to exceed the predetermined cell coverage area, in case an electrical tilt is below a maximum value.

13. The method as claimed in claim 11, wherein the determining the source cell is outside the predetermined overage area comprises:

determining, via the processor, that the source cell is a low dominance cell that fails to reach the predetermined cell coverage area based on:
the calculated first TA percentage is greater than 50%;
the calculated overlap percentage is greater than 30%; and
the calculated second TA percentage is greater than 2%; and
wherein the recommending the adjustment of the antenna tilt comprises antenna up-tilt, for the source cell determined to be the low dominance cell, in case an electrical tilt is above a minimum value.

14. The method as claimed in claim 11,
wherein the first distance range is between the center of the source cell and less than one kilometer (KM) from the center of the source cell;
wherein the second distance range is equal to or greater than one KM from the center of the source cell and less than 1.5 KM from the center of the source cell;
wherein the third distance range is equal to or greater than 1.5 KM from the center of the source cell.

15. A non-transitory computer-readable recording medium having recorded thereon instructions executable by at least one processor configured to perform a method for optimizing antenna tilt in a cell site of a radio access network (RAN), the method comprising:
obtaining input data for a source cell and for neighboring cells thereof at a plurality of predetermined geolocations;
determining an overlap percentage of the source cell and the neighboring cells thereof from the input data obtained at the plurality of predetermined geolocations;
determining, for the source cell, at least one TA percentage for at least one distance range from a center of the source cell;
determining, based on the determined overlap percentage and the determined at least one TA percentage, that the source cell is outside a predetermined cell coverage area; and
recommending, based on the determining that the source cell is outside the predetermined cell coverage area, adjustment of the antenna tilt for the source cell to meet the predetermined cell coverage area.

16. The non-transitory computer-readable recording medium as claimed in claim 15, wherein the overlap percentage is determined based on one or more predetermined overlap conditions, the one or more predetermined overlap conditions comprising at least one of:
a condition that a number of the neighboring cells is greater than or equal to two; and
a condition that a number of input data samples is greater than or equal to a predetermined number.

17. The non-transitory computer-readable recording medium as claimed in claim 15, wherein the overlap percentage is calculated based on a ratio of a number of input data samples obtained for the source cell at the plurality of predetermined geolocations and a total number of input data samples comprising the input data samples obtained for the source cell at the plurality of predetermined geolocations and input data samples obtained for the neighboring cells of the source cell at the plurality of predetermined geolocations.

18. The non-transitory computer-readable recording medium as claimed in claim 15, wherein the determining the at least one TA percentage comprises:

calculating a first TA percentage based on TA data from TA data samples obtained within a first distance range from the center of the source cell;

calculating a second TA percentage based on TA data from TA data samples obtained within a second distance range from the center of the source cell;

calculating a third TA percentage based on TA data from TA data samples obtained within in a third distance range from the center of the source cell.

19. The non-transitory computer-readable recording medium as claimed in claim 18, wherein the determining the source cell is outside the predetermined overage area comprises:

determining that the source cell exceeds the predetermined cell coverage area based on:

the calculated third TA percentage is greater than 50%;

the calculated overlap percentage is greater than 20%; and the calculated second TA percentage is greater than 2%; and wherein the recommending the adjustment of the antenna tilt comprises recommending antenna down-tilt, for the source cell determined to exceed the predetermined cell coverage area, in case an electrical tilt is below a maximum value.

20. The non-transitory computer-readable recording medium as claimed in claim 18, wherein the determining the source cell is outside the predetermined overage area comprises:

determining that the source cell is a low dominance cell that fails to reach the predetermined cell coverage area based on:

the calculated first TA percentage is greater than 50%;

the calculated overlap percentage is greater than 30%; and the calculated second TA percentage is greater than 2%; and wherein the recommending the adjustment of the antenna tilt comprises antenna up-tilt, for the source cell determined to be the low dominance cell, in case an electrical tilt is above a minimum value.

\* \* \* \* \*